(12) United States Patent
Miller et al.

(10) Patent No.: US 10,596,673 B1
(45) Date of Patent: Mar. 24, 2020

(54) MODULAR PRESSURE APPLICATION SYSTEM

(71) Applicant: Elijah Tooling, Inc., Denton, TX (US)

(72) Inventors: Richard V. Miller, Denton, TX (US); Julie A. Miller, Denton, TX (US); Austin C. Styer, Denton, TX (US); Derek L. Phillips, Denton, TX (US)

(73) Assignee: Elijah Tooling, Inc., Denton, TX (US)

( * ) Notice: Subject to any disclaimer, the term of this patent is extended or adjusted under 35 U.S.C. 154(b) by 0 days.

(21) Appl. No.: 15/356,321

(22) Filed: Nov. 18, 2016

Related U.S. Application Data (60) Provisional application No. 62/256,865, filed on Nov. 18, 2015.

(51) Int. Cl.
  *B25B 5/10* (2006.01)
  *B23Q 17/00* (2006.01)
  *B25B 1/10* (2006.01)

(52) U.S. Cl.
  CPC ............ *B23Q 17/005* (2013.01); *B25B 1/103* (2013.01)

(58) Field of Classification Search
  USPC ................................. 269/136, 236, 244, 329
  See application file for complete search history.

(56) References Cited

U.S. PATENT DOCUMENTS

| | | | |
|---|---|---|---|
| 1,256,706 A | 2/1918 | Lewis | |
| 1,842,724 A | 1/1932 | Langsner | |
| 2,341,619 A * | 2/1944 | Huss | B23C 7/00 269/101 |
| 2,376,089 A | 5/1945 | Savageau | |
| 2,639,179 A | 3/1950 | Phelps | |
| 2,705,441 A | 3/1951 | Armstrong | |
| 2,587,025 A | 2/1952 | Beck et al. | |
| 2,625,861 A | 1/1953 | Swanson | |
| 2,919,736 A | 1/1960 | Kann | |
| 2,988,855 A | 6/1961 | Asfour et al. | |
| 2,992,685 A | 7/1961 | Madsen | |
| 3,124,190 A | 3/1964 | Cornell | |
| 3,250,559 A | 5/1966 | Sommerfield | |
| 3,255,799 A | 6/1966 | Heimovics | |
| 3,418,869 A | 12/1968 | Herpich | |
| 3,424,212 A | 1/1969 | Kemper | |
| 3,455,198 A | 7/1969 | Barrett | |
| 3,537,697 A | 11/1970 | Davis | |
| 3,578,799 A | 5/1971 | Davis | |
| 3,683,988 A | 8/1972 | Carter et al. | |
| 4,139,315 A | 2/1979 | Levy et al. | |
| 4,191,367 A * | 3/1980 | Speiser | B25B 1/02 269/203 |
| 4,275,983 A | 6/1981 | Bergman | |

(Continued)

OTHER PUBLICATIONS

Boeing drawing "Back-Bolt Assembly", Dec. 13, 1993.

(Continued)

*Primary Examiner* — Joseph J Hail
*Assistant Examiner* — Shantese L McDonald
(74) *Attorney, Agent, or Firm* — James E. Walton (57) ABSTRACT

A pressure applying system using a fixed vise and an adjustable vise. The fixed base utilizes strain gages to measure an amplitude of forces applied to the fixed base through a working member from the adjustable base. The adjustable base utilizes a bi directional worm screw to apply a linear force to the working member relative to the fixed base.

10 Claims, 6 Drawing Sheets

(56) References Cited

U.S. PATENT DOCUMENTS

| | | | |
|---|---|---|---|
| 4,299,377 A * | 11/1981 | Lenz | B25B 1/106 |
| | | | 269/136 |
| 4,396,327 A | 8/1983 | Menke | |
| 4,534,546 A | 8/1985 | Cattani | |
| 4,723,881 A | 2/1988 | Duran | |
| 4,735,536 A | 4/1988 | Duran | |
| 4,738,438 A * | 4/1988 | Horie | B23Q 17/005 |
| | | | 269/136 |
| 4,747,738 A | 5/1988 | Duran | |
| 4,815,908 A | 3/1989 | Duran et al. | |
| 4,846,622 A | 7/1989 | Lien | |
| 4,850,771 A | 7/1989 | Hurd | |
| 4,863,326 A | 9/1989 | Vickers | |
| 4,865,500 A | 9/1989 | Duran et al. | |
| 4,884,930 A | 12/1989 | Dobbeler | |
| 4,915,557 A | 4/1990 | Stafford | |
| 4,934,888 A | 6/1990 | Corsmeier et al. | |
| 4,963,063 A | 10/1990 | Gulistan | |
| 5,338,139 A | 8/1994 | Swanstrom | |
| 5,462,395 A | 10/1995 | Damm et al. | |
| 5,611,654 A | 3/1997 | Frattarola et al. | |
| 6,022,009 A | 2/2000 | Hill | |
| 6,095,736 A | 8/2000 | Miller et al. | |
| 6,102,640 A | 8/2000 | Yokohama et al. | |
| 6,220,803 B1 | 4/2001 | Schellhase | |
| 6,296,431 B1 | 10/2001 | Miller | |
| 6,312,185 B1 | 11/2001 | Ernst | |
| 6,931,969 B2 * | 8/2005 | Hsien | B25B 13/12 |
| | | | 81/170 |
| 7,004,699 B2 | 2/2006 | Petrok et al. | |
| 2009/0121405 A1 * | 5/2009 | Brown | B23K 37/0435 |
| | | | 269/216 |

OTHER PUBLICATIONS

Vought drawing, date unknown.
Vought Aircraft Company drawing, Jan. 4, 1994, maybe earlier.
Schunk—Workholding Solutions, Automation Components, Toolholding Components. Printed from www.schunk.com website, Aug. 6, 2009.
Jergens Catalog—Ball Lock Mounting System catalogue, last accessed on Aug. 12, 2009.
Notice of Allowance and Examiner's Amendment dated Feb. 27, 2014 in U.S. Appl. No. 12/540,318.
Advisory Action Before the Filing of an Appeal Brief dated Jan. 28, 2014 in U.S. Appl. No. 12/540,318.
Applicant-Initiated Interview Summary dated Jan. 16, 2014 in U.S. Appl. No. 12/540,318.
Amendment After Final filed Jan. 7, 2014 in U.S. Appl. No. 12/540,318.
Office Action dated Nov. 7, 2013 in U.S. Appl. No. 12/540,318.
Amendment filed Oct. 2, 2013 in U.S. Appl. No. 12/540,318.
Office Action dated Jul. 2, 2013 in U.S. Appl. No. 12/540,318.
Response to Restriction Requirement filed Mar. 13, 2013 in U.S. Appl. No. 12/540,318.
Office Action dated Feb. 12, 2013 in U.S. Appl. No. 12/540,318.
Response to Notice to File Corrected Application Papers filed Oct. 26, 2009 in U.S. Appl. No. 12/540,318.
Notice to File Corrected Application Papers dated Aug. 27, 2009 in U.S. Appl. No. 12/540,318.
Office Action dated Mar. 12, 2009 in U.S. Appl. No. 11/473,274.
Amendment filed Dec. 16, 2008 in U.S. Appl. No. 11/473,274.
Office Action dated Sep. 26, 2008 in U.S. Appl. No. 11/473,274.
Response to Restriction Requirement filed Jun. 19, 2008 in U.S. Appl. No. 11/473,274.
Office Action dated Apr. 21, 2008 in U.S. Appl. No. 11/473,274.
Notice of Allowance and Examiner's Amendment dated Oct. 19, 2015 in U.S. Appl. No. 13/347,420.
Amendment After Final filed Sep. 30, 2015 in U.S. Appl. No. 13/347,420.
Office Action dated Sep. 9, 2015 in U.S. Appl. No. 13/347,420.
Amendment filed Jun. 1, 2015 in U.S. Appl. No. 13/347,420.
Office Action dated May 5, 2015 in U.S. Appl. No. 13/347,420.
Response to Restriction Requirement filed Jan. 15, 2015 in U.S. Appl. No. 13/347,420.
Office Action dated Dec. 26, 2014 in U.S. Appl. No. 13/347,420.

* cited by examiner

MODULAR PRESSURE APPLICATION SYSTEM

CROSS REFERENCE TO RELATED APPLICATIONS

This application claims the benefit of U.S. Provisional Application No. 62/256,865, filed 18 Nov. 2015, titled "Precision Locating Fastening System", all of which is hereby incorporated by reference for all purposes as if fully set forth herein.

BACKGROUND

Field of the Invention

The present invention relates in general to modular vices, and, in particular, to modular vices that provide digital feedback regarding applied force. Conventional vices have a fixed opening and do not provide feedback to the user. Therefore the user is likely to over apply force to a working material while holding it in a vice. Materials that have been retained in a vice under too much stress require additional work to accommodate the effects of the overstress. Furthermore, because the opening on conventional vices are fixed, larger pieces of working material cannot be retained if they are bigger than the throw of a conventional vice.

There are many designs of vices well known in the art. However, considerable shortcomings remain.

BRIEF DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION

Illustrative embodiments of the apparatus and method are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of the present application will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

An improved vise system described herein provides digital feedback to the user through the use of sensors configured to measure the clamping force provided between a fixed base and an adjustable base. The fixed base utilizes strain gages to measure an amplitude of forces applied to the fixed base through a working member from the adjustable base. The adjustable base utilizes a bi directional worm screw to apply a linear force to the working member relative to the fixed base. Each element in the system is positive located. "Positively locating" is defined as locating the element, such as an adjustable vise, in all three axis. A whole vice is created by pairing an adjustable base vice with a fixed base vice so that a distance between the grippers of the adjustable base vice and fixed base vice can be adjusted by moving part of the adjustable base vice.

Figure 1:
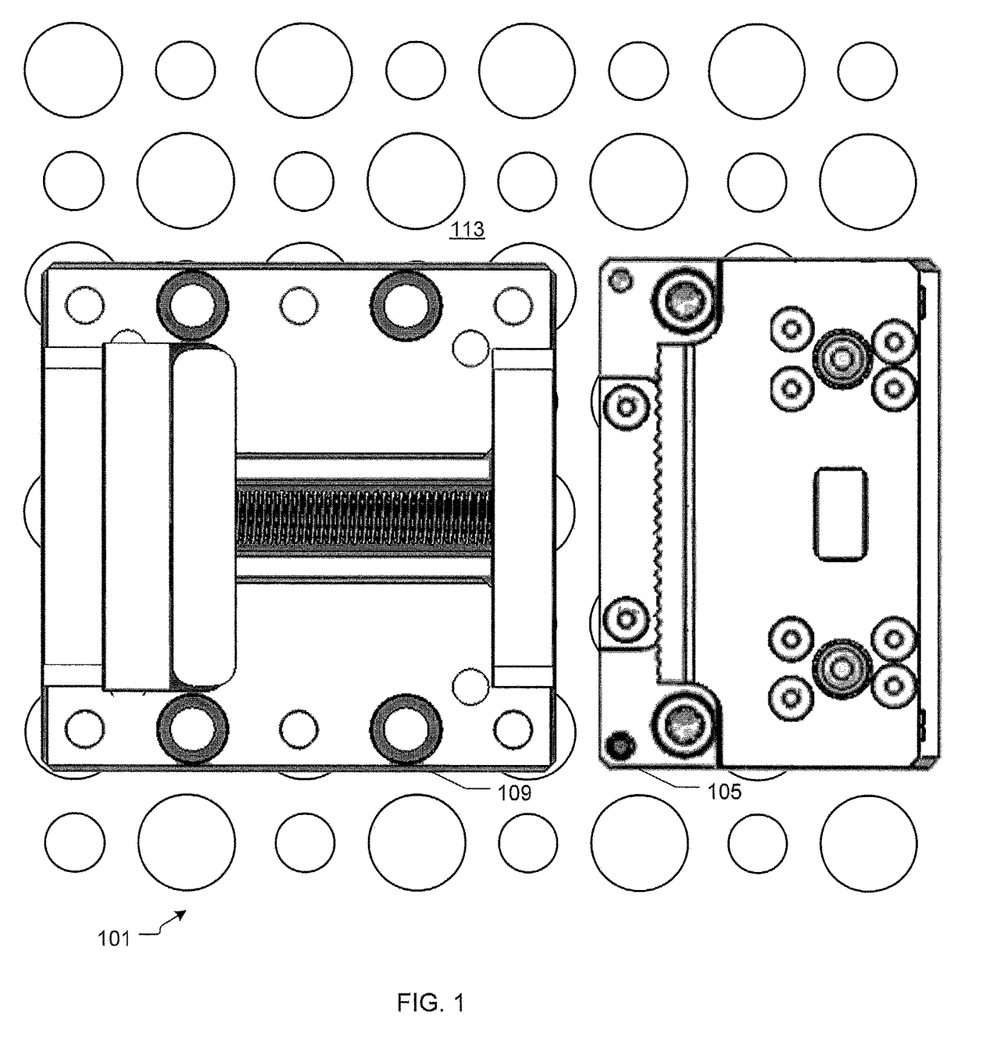
FIG. 1 is a top view of an improved vice system in accordance with a preferred embodiment of the present application.
Figure 2A:
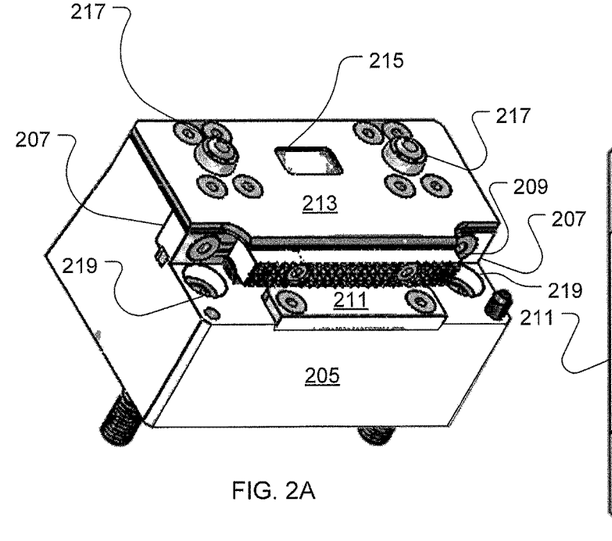
FIG. 2A is a perspective view of a fixed vise in accordance with a preferred embodiment of the present application.
Figure 2B:
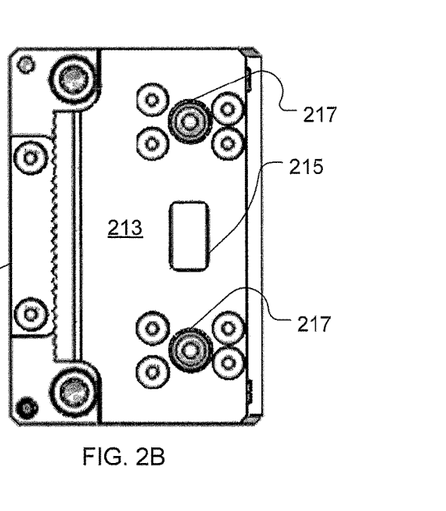
FIG. 2B is a top view of a fixed vise in accordance with a preferred embodiment of the present application.
Figure 2C:
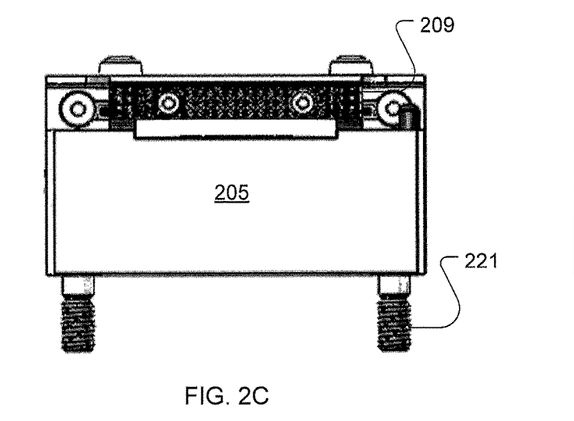
FIG. 2C is a front view of a fixed vise in accordance with a preferred embodiment of the present application.
Figure 2D:
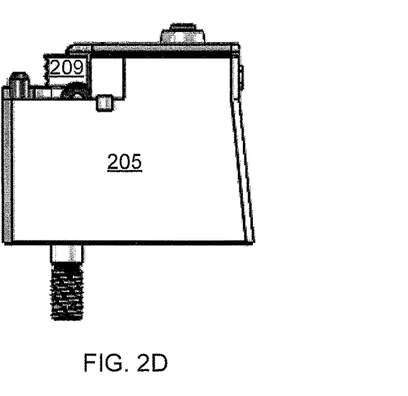
FIG. 2D is an end view of a fixed vise in accordance with a preferred embodiment of the present application.
Figure 3A:
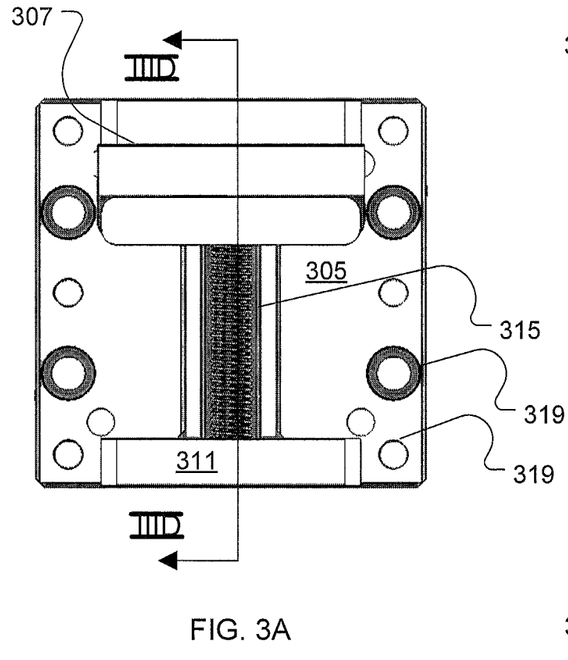
FIG. 3A is a top view of an adjustable vise in accordance with a preferred embodiment of the present application.
Figure 3B:
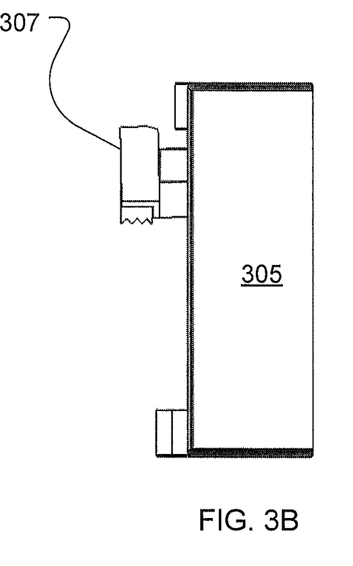
FIG. 3B is an end view of an adjustable vise in accordance with a preferred embodiment of the present application.
Figure 3C:
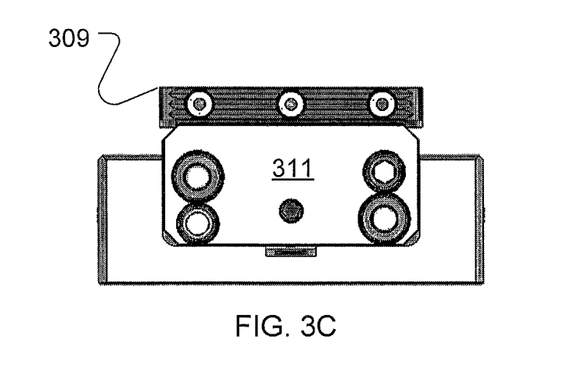
FIG. 3C is a front view of an adjustable vise in accordance with a preferred embodiment of the present application.
Figure 3D:
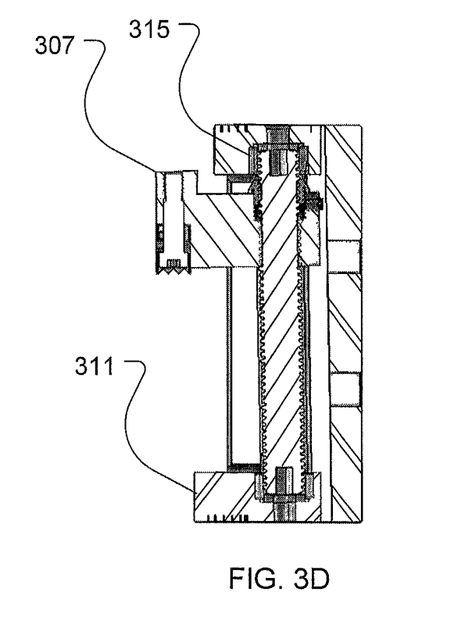
FIG. 3D is a section view of an adjustable vise taken along line IIID in accordance with a preferred embodiment of the present application.

The improved system is modular and allows users to move various elements in the system to accommodate working materials without having a fixed opening. Referring now to FIG. 1, a top view of the improved vice system is illustrated. System 101 is comprised of a fixed vise 105, and an adjustable vise 109, both retained on a fixture plate 113.

The fixed vise 105 can be moved relative to the adjustable vise 109 on the fixture plate 113 to hold parts or working materials as large as the fixture plate. Additionally supports can be utilized as needed between the fixed vise and the adjustable vise to support large spans. While illustrated as a fixed vise and an adjustable vise, it should be apparent that the system may be comprised of a pair of adjustable vises or some other combination of fixed and adjustable vises as needed to retain the object.

Referring now also to FIGS. 2A-2D, various views of a fixed vise 201 are illustrated. Fixed vise 201 is comprised of a base 205, a pair of spring blocks 207, a gripper 209, a wear pad 211, a cover plate 213, a screen 215 or display wired to and for a microcontroller located underneath the cover plate, a power supply (not shown), and a pair of input devices 217. Base 205 has a plurality of surfaces some parallel and some orthogonal to the plane of the fixture plate. Base 205 is configured to be mounted to a fixture plate and is comprised of a plurality of openings 219. Some of openings 219 are configured for a fastener 221 going from the top of the base through to screw into the fixture plate. Some of openings are configured for a fastener going from the fixture plate to be screwed into the base 205. Each of the spring block 207 has a first end fastened to the base 205 and a second end fastened to the gripper 209. As a force is applied to the gripper 209 the spring blocks are placed under strain.

Microcontroller is wired to a pair of strain gages located on one of the spring blocks 207 thereby forming a half bridge circuit capable of measuring force from tightening the adjustable vise relative to the fixed vise. A first strain gage is located on a first surface of the spring block and a second strain gage is located on a second surface of the spring block opposite the first surface. In an alternative embodiment each spring block uses a pair of strain gages wired to the microcontroller as a full bridge between the two spring blocks. The screen 215 preferably displays the force measured by the strain gages and features a preset system. The preset system allows users to input a certain force, such as one hundred pounds, and as the strain gages measure the preset force of one hundred pounds an alert is issued to the user. The alert preferably is a flashing screen, but may be a light emitting diode, a change in color in the screen, and/or an audible alarm. Furthermore, the output of the strain gage and or the output of the microcontroller may be used in a control loop to control a motorized screw drive system. For example, the user may set the system to apply only twenty-five pounds of force to retain a block and the motorized screw system would start tightening until the microcontroller measured the twenty-five pounds.

Preferably the input devices 217 are a first and second push button switch. The input devices provide control to the microcontroller by the user. For example power to the microcontroller from the power supply can be turned off and on. The user can adjust alerts, limits, units, and calibration data by actuation of the switch. Furthermore, the system further comprises a wired or a wireless link such that the microcontroller can be coupled to a remote controller and or datalogger. Recording with a datalogger the forces applied to working materials or parts over time generates a log for quality control. For example, a smartphone can be used as a remote viewing device to provide an additional screen in addition to the screen 215 and can also be used to record the forces measured over time.

Referring now also to FIGS. 3A-3D, various views of an adjustable vise 301 are illustrated. Adjustable vise 301 is comprised of a base 305, a pusher 307, a gripper 309, a wear pad 311, and a drive screw assembly 315. Base 305 is configured to be mounted to a fixture plate and is comprised of a plurality of openings 319. Base 305 has a plurality of surfaces some parallel and some orthogonal to the plane of the fixture plate. Some of openings 319 are configured for a fastener going from the top of the base through to screw into the fixture plate. Some of openings 319 are configured for a fastener going from the fixture plate to be screwed into the base 305. The openings 319 are configured to allow the base 305 to be mounted to at least 2 different tables having varied hole patterns in the table. Pusher 307 is angled and located in a t-slot of the base, the t-slot is cut at a downward angle relative to the rest of the base, typically 1 degree relative to the fixture plate, as clearly shown in the section view 3D. Therefore the pusher translates in a non-parallel plane relative to the fixture plate. Pusher 307 is rotationally coupled to the drive screw assembly so that as the drive screw assembly is rotated by the user the pusher move along an axis defined by the t-slot. The drive screw assembly typically is rotated by insertion of a hex key in either end of drive screw assembly and turning the hex key. Wear pad 311 is held to the base by fasteners and is replaceable. Wear pad 311 is the preferred location on the adjustable vise to support the part to be retained. The gripper 309 is held to the pusher by a set of fasteners. Gripper 309 is reversible and has a side with grooves as shown and a smooth side not shown.

During use of the modular pressure application system the user couples at least one of the vises to the fixture plate. Typically the fixed vise is coupled to the fixture plate first. Then the user couples the adjustable vise a distance away from the fixed vise. The distance away is calculated to allow for the securement of the item to be held.

The part is placed on the wear pads of both vises. The user then rotates the drive screw to apply pressure to the item being held between the adjustable vise and the fixed vise. As a force is applied to the gripper of the fixed vise the gripper applies strains to the spring blocks coupled to the gripper of the fixed vise. The strain gages located on the spring blocks then measure the strains in at least one of the spring blocks. The output of the strain gage is indicated to the user, typically on a screen, such that the user can measure the force applied to the item being held as the drive screw is being turned.

Figure 4:
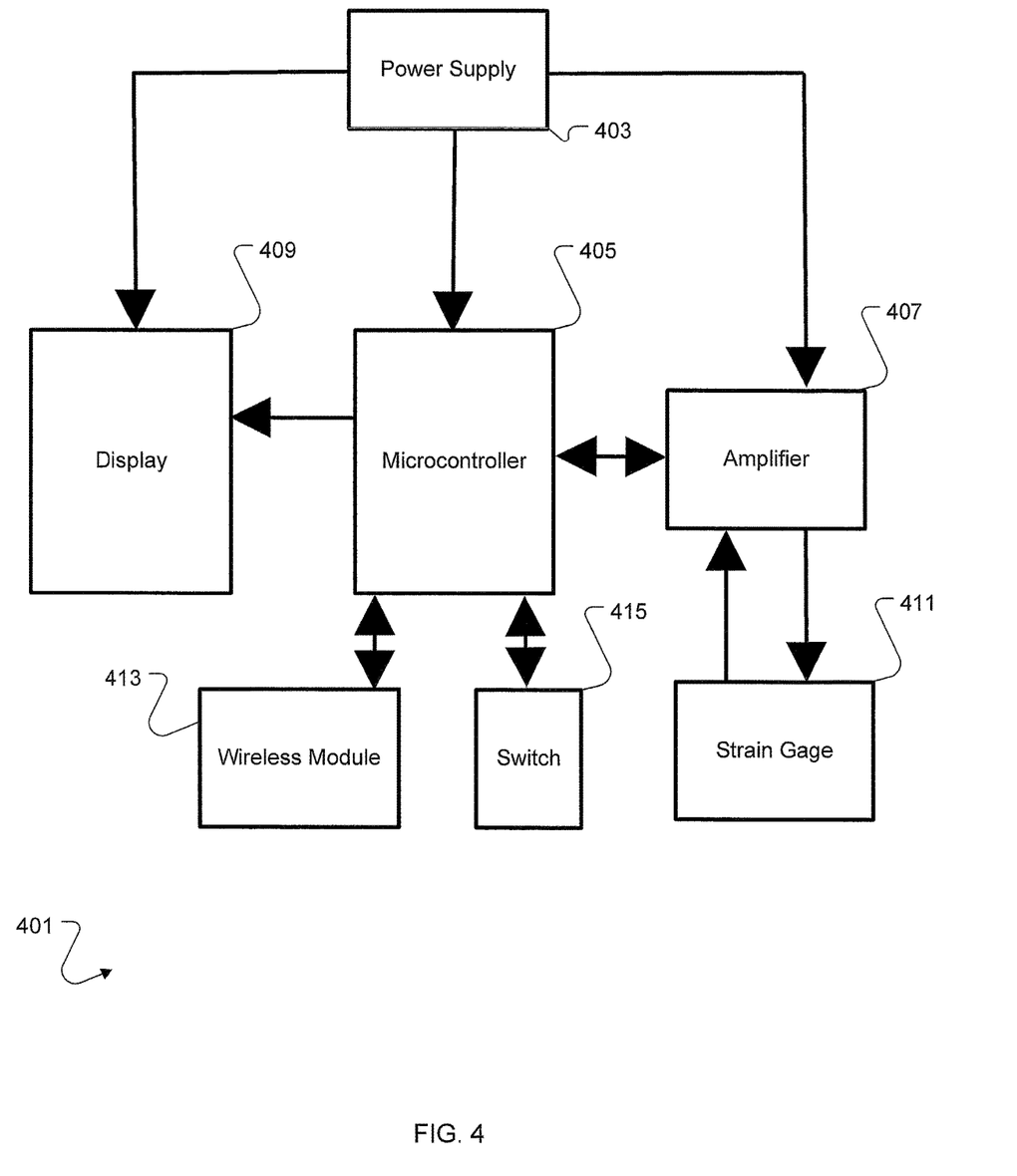
FIG. 4 is a schematic of a modular pressure application system in accordance with a preferred embodiment of the present application.

Referring now also to FIG. 4 a schematic of the Modular Pressure Application System is illustrated. System 401 is comprised of power supply 403, a microcontroller 405, an amplifier 407, a display 409, a strain gage 411, a wireless module 413, and a switch 415. Power supply 403 is typically a direct current power source, such as a nine volt battery, and provides power for the display 409, the microcontroller 405, and the amplifier 407. The power supply 403 also provides power for the wireless module in those embodiments with a wireless module. The amplifier 407 provides a supply voltage to the strain gage 411 and amplifies the resulting output voltage from the strain gage. The microcontroller 405 measures the amplified output voltage from the amplifier and creates a visual indicator on the display 409. Visual indicator is preferably textual but may be a bar chart or other indication of force applied. Switch 415 is coupled to the microcontroller and allows the user to select menus and zero the system as needed. Microcontroller 405 generates the digital display for the user on the display 409 my converting the analog output of the strain gage into a digital measurement configured for a liquid crystal screen such as display 409.

Figure 5:
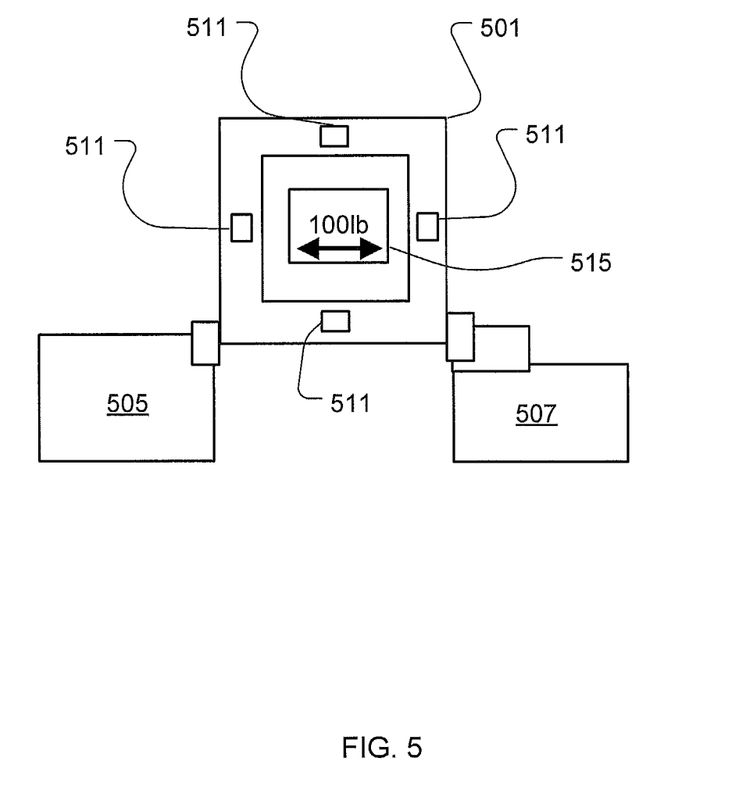
FIG. 5 is a front view of a calibration block in accordance with a preferred embodiment of the present application.

Referring now also to FIG. 5 a side view of a calibration block of the Modular Pressure Application System is illustrated. Calibration block 501 is secured between a fixed vise 505 and an adjustable vise 507. Calibration block 501 is comprised of a calibrated system of strain gages 511, a power supply, a controller, and a display 515. Calibration block is remotely calibrated in a lab so that the display accurately indicates the applied forces. The user places the calibration block in the modular pressure application system and engages the adjustable vise 507 and then compares the display 515 of the calibration block to the display of the fixed vise to determine the offset of the fixed vise. Therefore the fixed vise does not have to be returned to a calibration lab as the calibration can be done in the field.

Figure 6A:
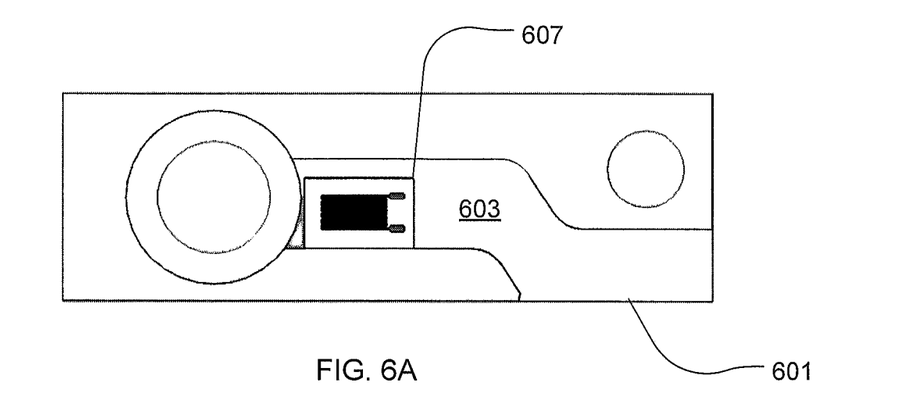
FIG. 6A is a front view of a spring block in accordance with a preferred embodiment of the present application.
Figure 6B:
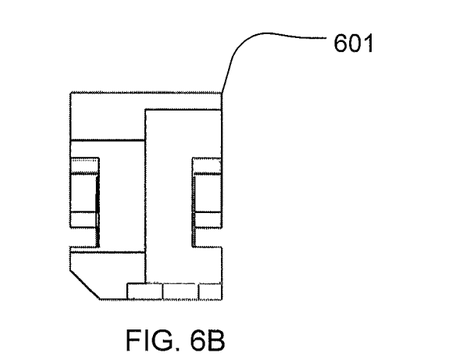
FIG. 6B is an end view of a spring block in accordance with a preferred embodiment of the present application.
Figure 6C:
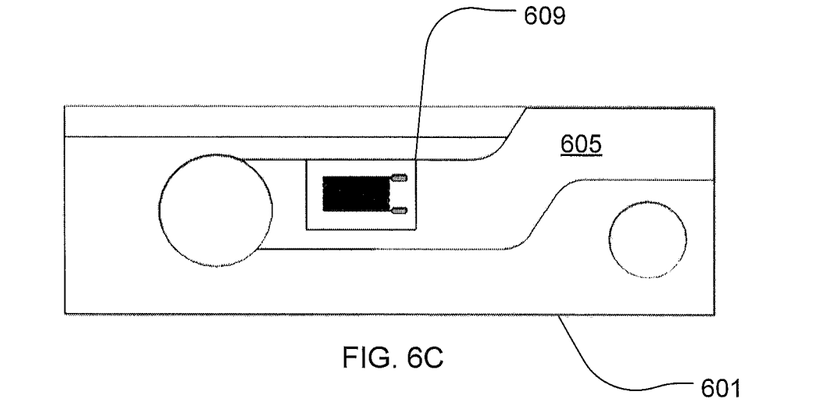
FIG. 6C is a back view of a spring block in accordance with a preferred embodiment of the present application.

Referring now also to FIG. 6 various views of a spring block of the Modular Pressure Application System is illustrated. Spring block 601 is comprised of a first surface 603 and a second surface 605. Spring block 601 further comprises a first strain gage 607 located on the first surface and a second strain gage 609 located on the second surface 605. Both the first 603 and second surfaces 605 are formed by creating two channels in the spring block. The channels provide a recessed location for the strain gage and the wiring connecting the strain gages.

The improved modular vice system standardizes the forces that are applies to the working material for the specific purpose of managing the internal stress applied to the material or part being held.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A modular vice system for securing a part, comprising:
an adjustable vise having a manually operated drive screw for advancing and retracting a pusher member, wherein at least one end of the drive screw is configured to receive a drive tool for turning the drive screw;
a fixed vise comprising:
a force measuring system; and
one or more apertures passing through the adjustable vise, whereby the adjustable vise may be releasably attached to a fixture plate;
one or more apertures passing through the fixed vise, whereby the fixed vise may be releasably attached to the fixture plate;
wherein the part is retained between the adjustable vise and the fixed vise; and
wherein the force measuring system determines a force applied to the part from the adjustable vise and the fixed vise.

2. The modular vice system according to claim 1, the force measuring system comprising:
a strain gage.

3. The modular vice system according to claim 2, wherein the fixed vise further comprises:
a spring block;
wherein the strain gage is located on the spring block.

4. The modular vice system according to claim 2, the force measuring system further comprising:
a microcontroller wired to the strain gage; and
a display wired to the microcontroller;
wherein the display indicates the force.

5. The modular vice system according to claim 1, the force measuring system comprising:
a first strain gage; and
a second strain gage.

6. The modular vice system according to claim 5, the fixed vise further comprising:
a spring block;
wherein the first strain gage is located on a first surface of the spring block; and
wherein the second strain gage is located on a second surface of the spring block.

7. A modular pressure application system, comprising:
an adjustable base, comprising:
a first base member;
a pusher;
a manually operated drive screw assembly coupling the first base member to the pusher, the drive screw assembly being configured to advance and retract the pusher, wherein at least one end of the drive screw is configured to receive a drive tool for turning the drive screw; and
one or more apertures passing through the first base member, whereby the adjustable base may be releasably attached to a fixture plate;
a fixed base, comprising:
a second base member;
a first spring block;
a second spring block;
a first pair of strain gages located on the first spring block;
a controller wired to the first pair of strain gages;
a display wired to the controller; and
one or more apertures passing through the second base member, whereby the fixed base may be releasably attached to the fixture plate.

8. The modular pressure application system according to claim 7, wherein the first base member comprises:
an angled opening;
wherein the angled opening configures the pusher to move at an angle relative to the fixture plate.

9. The modular pressure application system according to claim 7, the fixed base further comprising:
a second pair of strain gages located on the second spring block;
wherein the controller is wired to the second pair of strain gages.

10. The modular pressure application system according to claim 7, wherein the drive screw assembly is operable from a first side and a second side of the adjustable base.

* * * * *